(12) United States Patent
Robinson et al.

(10) Patent No.: US 6,360,007 B1
(45) Date of Patent: Mar. 19, 2002

(54) DYNAMIC OPTIMIZED COLOR LUT TRANSFORMATIONS BASED UPON IMAGE REQUIREMENTS

(75) Inventors: David C. Robinson, Penfield; Louis O. Pepin, Rochester, both of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/220,183

(22) Filed: Dec. 22, 1998

(51) Int. Cl.$^7$ .................................................. G06K 9/00
(52) U.S. Cl. ...................................... 382/162; 382/164
(58) Field of Search .................................. 382/162, 163, 382/164, 165, 166, 167, 168, 169, 170, 171, 172; 358/518, 504, 525, 500, 501, 406, 515, 519, 520, 521; 345/153, 154, 199

(56) References Cited

U.S. PATENT DOCUMENTS

| | | | |
|---|---|---|---|
| 5,254,978 A | * | 10/1993 | Beretta ........................ 345/150 |
| 5,305,119 A | | 4/1994 | Rolleston et al. |
| 5,307,182 A | | 4/1994 | Maltz |
| 5,416,613 A | | 5/1995 | Rolleston et al. |
| 5,471,324 A | | 11/1995 | Rolleston |
| 5,483,360 A | | 1/1996 | Rolleston et al. |
| 5,528,386 A | | 6/1996 | Rolleston et al. |
| 5,581,376 A | | 12/1996 | Harrington |
| 5,592,591 A | | 1/1997 | Rolleston |
| 5,594,557 A | | 1/1997 | Rolleston et al. |
| 5,649,072 A | | 7/1997 | Balasubramanian |
| 5,668,890 A | * | 9/1997 | Winkelman ................ 382/167 |
| 5,689,350 A | | 11/1997 | Rolleston |
| 5,734,802 A | | 3/1998 | Maltz et al. |
| 5,739,927 A | | 4/1998 | Balasubramanian et al. |
| 5,787,193 A | | 7/1998 | Balasubramanian |
| 5,802,214 A | | 9/1998 | Eschbach et al. |
| 6,072,464 A | * | 6/2000 | Ozeki ......................... 345/154 |
| 6,072,902 A | * | 6/2000 | Myers ......................... 382/167 |

* cited by examiner

Primary Examiner—Phuoc Tran
Assistant Examiner—Amir Alavi
(74) Attorney, Agent, or Firm—Fay, Sharpe, Fagan, Minnich & McKee, LLP (57) ABSTRACT

A method and apparatus which improves the precision of a color look-up table used to transform from the input image's color space to device-dependent print engine color space. The generated look-up table includes nodes in excess of those necessary for a single image transformation. A node selecting device allows for the selection of a subset of the nodes in accordance with image requirements which can be determined either alone or in combination, a distribution of color content of the image throughout the print engine color space, or customer-defined critical color regions.

27 Claims, 8 Drawing Sheets

DYNAMIC OPTIMIZED COLOR LUT TRANSFORMATIONS BASED UPON IMAGE REQUIREMENTS

BACKGROUND OF THE INVENTION

The present invention is directed to generating look-up tables representative of printer characteristics to enable the conversion of colors defined in a first color space to colors defined in the printer color space, and more particularly, to a method and apparatus for selecting nodes of a look-up table so that the selected nodes are positioned within regions of the color space transformation to provide increased color precision for those selected regions.

In digital printing, a customer or submitted job is converted into a printable job via a Raster Input Processor (RIP). One of the functions contained in the RIP is the conversion from the color space defined within the customer job to that of the color space of the printing device.

The generation of color documents can be thought of as a two step process: first, the generation of the image by means of scanning an original document with a color image input terminal or scanner or, alternatively, creating a color image on a work-station operated in accordance with a color image creation program; and secondly, printing of that image with a color printer in accordance with the colors defined by the scanner or computer generated image. Scanner densitometric RGB (red, green, blue) channel output is commonly transformed to the CIE XYZ color space or a color space that is a transformation of the CIE XYZ color space. In the case of computer generated images, color defined by the user at the user interface of a work station can be defined or transformed to a color space that is a transform of the CIE XYZ color space. The CIE XYZ color space and its transformations can be thought of as a "device independent" color space in that the color spaces unambiguously define color information that is not limited by the luminance dynamic range and color gamut of any physically realizable device.

Printers often have an output which can be defined as existing in a color space called CMYK (cyan-magenta-yellow-key or black) which is uniquely defined for the printer by its capabilities and colorants. Printers operate by the addition of multiple layers of ink or colorant in layers to a page. The response of the printer tends to be relatively non-linear. These colors are defined for a particular device, and accordingly reference is made to the information as being "device dependent." Thus, while a printer receives information in a device independent color space, it must convert that information to print in a device dependent color space, which reflects the gamut or possible range of colors of the printer.

The desirability of operating in a device independent color space with subsequent conversion to a device dependent color space is well known, as shown by U.S. Pat. No. 4,500,919 to Schreiber; U.S. Pat. No. 2,790,844 to Neugebauer; and U.S. Pat. No. 4,275,413 to Sakamoto all of which are hereby incorporated by reference. There are many methods of conversion between color spaces, all of which begin with the measurement of printer response to certain input values. Commonly, a printer is driven with a set of input values reflecting color samples throughout the printer gamut, the color samples are printed in normal operation of the printer.

In U.S. Pat. No. 4,275,413 to Sakamoto, the information derived is placed into look-up tables, stored in a memory, perhaps ROM memory or RAM memory where the look-up table relates input color space to output color space. The look-up table is commonly a three-dimensional table since color is defined with three variables. However, while the preceding is true, it is possible to have color spaces with less than three dimensions or more than three dimensions.

In an RGB color space, at a scanner or computer, space can be defined as three dimensional with black at the origin of a three dimensional coordinate system 0, 0, 0, and white at the maximum of a three dimensional coordinate system which an 8-bit system, would be located at 255, 255, 255. Each of the three axes radiating from the origin point therefore respectively define red, green, and blue. A similar construct can be made for the printer, with axes representing cyan, magenta, and yellow. In the 8-bit system suggested, there will be, however, over 16 million possible colors ($256^3$). Thus, there are clearly too many values for a 1:1 mapping of RGB to CMY. Accordingly, as proposed in U.S. Pat. No. 4,275,413 to Sakamoto, only a relatively small number of samples are used to do the mapping from RGB to CMY, perhaps on the order of 1,000 (although as few as 500 and as many as 5,000 are also known to be used). Therefore, look-up tables consist of a set of values which could be said to be the intersections for corners of a set of cubes mounted on top of one another. Colors falling within each cubic volume can be interpolated from the measured values, through many methods including tri-linear interpolation, tetrahedral interpolation, polynomial interpolation, linear interpolation, and any other interpolation method depending on the desired speed and accuracy of the result.

Another method derives a value at a desired location as a function of all (or a significant set of) measured color values. One way of doing this is to use Shepard's Method (see, for example "Shepard's Method of 'Metric Interpolation' to Bivariate and Multivariate Interpolation" by W. Gordon and J. Wixom, Mathematics of Computation, Vol. 32, No. 141, January 1978, pp. 253–264). Shepard's Method suggests that a vector can be thought of as defining the difference between an asked-for color which was directed to a printer and the printed color. Then, for any other point in a color space which is desired, that point can be thought of as a vector quantity, derived by averaging over the space all the vectors, each vector weighted by a function which decreases its effect on the vector as that vector is further and further away from the point coloring question.

Alternatively the method of Po-Chieh Hung, "Colorimetric Calibration for Scanners and Media", SPIE, Vol. 1448, Camera and input Scanner System, (1991), describes a method of inverse tetrahedral interpolation, to the same effect as the described Shepard's Method (see also U.S. Pat. No. 5,296,923 to Hung, hereby incorporated by reference for its teachings). A requirement of this method is that the color space be segmented into a set of non-overlapping, space-filling tetrahedrons. This segmentation requirement is fulfilled by using only data from a full rectangular array of points, where it is easy to define the mesh of points which define the tetrahedrons.

Other examples of color printer calibration and color conversion processes include U.S. Pat. Nos. 5,689,350, 5,592,591, 5,471,324 to Rollston; U.S. Pat. Nos. 5,594,557, 5,528,386, 5,483,360, 5,416,613, and 5,305,119 to Rollston et al.; U.S. Pat. No. 5,581,376 to Harrington; U.S. Pat. Nos. 5,787,193 and 5,649,072 to Balasubramanian; U.S. Pat. No. 5,739,927 to Balasubramanian et al.; U.S. Pat. No. 5,307,182 to Maltz; and U.S. Pat. No. 5,734,802 to Maltz et al., all of which are hereby incorporated by reference for their teachings.

Thus, color conversion therefore consists of mapping points from a three-dimensional color space to a three-dimensional or four-dimensional color space. This mapping depends on the physical properties of a marking device or printer system which is typically non-linear. An approach to performing color conversion is to use a coarse three-dimensional look-up table and interpolation for colors not existing at a node of the look-up table, which provides an arbitrary mapping between different devices. The use of interpolation reduces the size of the table so that large amounts of memory are not required by the system to store a large number of sample points which must then be used in the color conversion process. It has been found that by using a larger number of nodes causes the overall system operation to operate at an undesirably slow level. However, limiting the amount of nodes in a look-up table, so that an acceptable processing speed is obtained, increases the amount of interpolation processing which is necessary. In turn, the increased use of interpolation increases the chance of inaccurate color conversion.

Therefore, it has been determined to be beneficial to provide a manner of increasing the amount of nodes located within a color space to thereby decrease inaccuracies due to interpolation, while at the same time maintaining operation speeds which will allow for substantially real-time print processing.

SUMMARY OF THE INVENTION

The present invention contemplates a new and improved method and apparatus for increasing the precision of a color look-up table used to transform an image from an input color space to a device-dependent print engine color space. Initially, a look-up table is generated having nodes that will be used in the transformation of image signals from the input color space to the device-dependent print engine color space. An image file which contains information of the image to be printed is interrogated to determine the distribution of color within that image color space. Thereafter parameters which are to be followed during the transformation of the image are determined. A subset of nodes from the look-up table are selected to be active during the image transformation processing based on the interrogation of the image file and the input parameters. Thereafter, the processing of the image from the input color space to the device-dependent print engine color space is undertaken using the selected nodes.

According to another aspect of the present invention, the look-up table is generated with a larger number of nodes larger than will be used in the image processing of a single image.

With attention to yet another aspect of the present invention, the interrogation of the image file, the receipt and determination of parameters, the selection of the subset of nodes based on the interrogation, and the parameters as well as the processing of the image are accomplished in substantially real time.

With still yet attention to another aspect of the present invention, the parameters selected can be based on customer-specified parameters input into the processing system.

A principal advantage of the present invention is improving the precision with which color from a first input color space is converted to output color of a second color space.

Another advantage of the invention resides in allowing the reallocation of active nodes corresponding to images color distribution within the print engine's color gamut.

Still another advantage of the invention is providing a better image detail for images of low, medium or high key (black).

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanied drawings which form a part hereof, and wherein.

DETAILED DESCRIPTION OF THE PREFERRED EMBODIMENT

Figure 1:
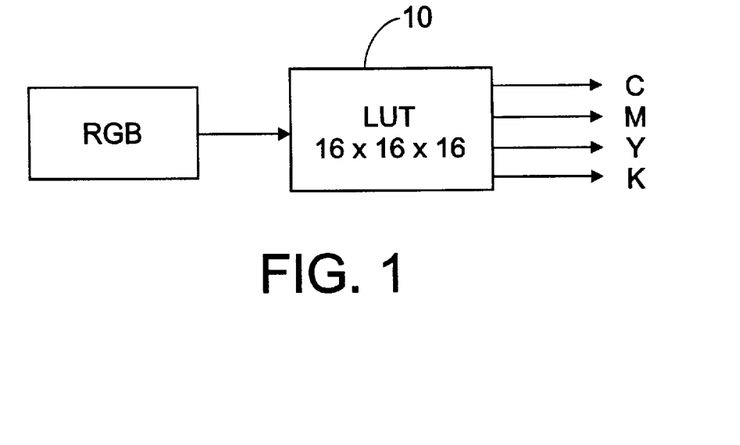
FIG. 1 is a systems diagram of a prior art three-dimensional look-up table conversion system.

FIG. 1 illustrates a simplified prior-art system by which RGB signals are converted to CMY or CMYK signals. Basically, the raw RGB signals from a digital, hard-copy scanner or computer, are submitted to a three-dimensional look-up table 10, and from this look-up table the appropriate CMYK signals are output. As is known, a look-up table such as 10 is in the form of electronic memory which can be accessed and caused to produce an output in response to electronic signal inputs in substantially real time.

Figure 2:
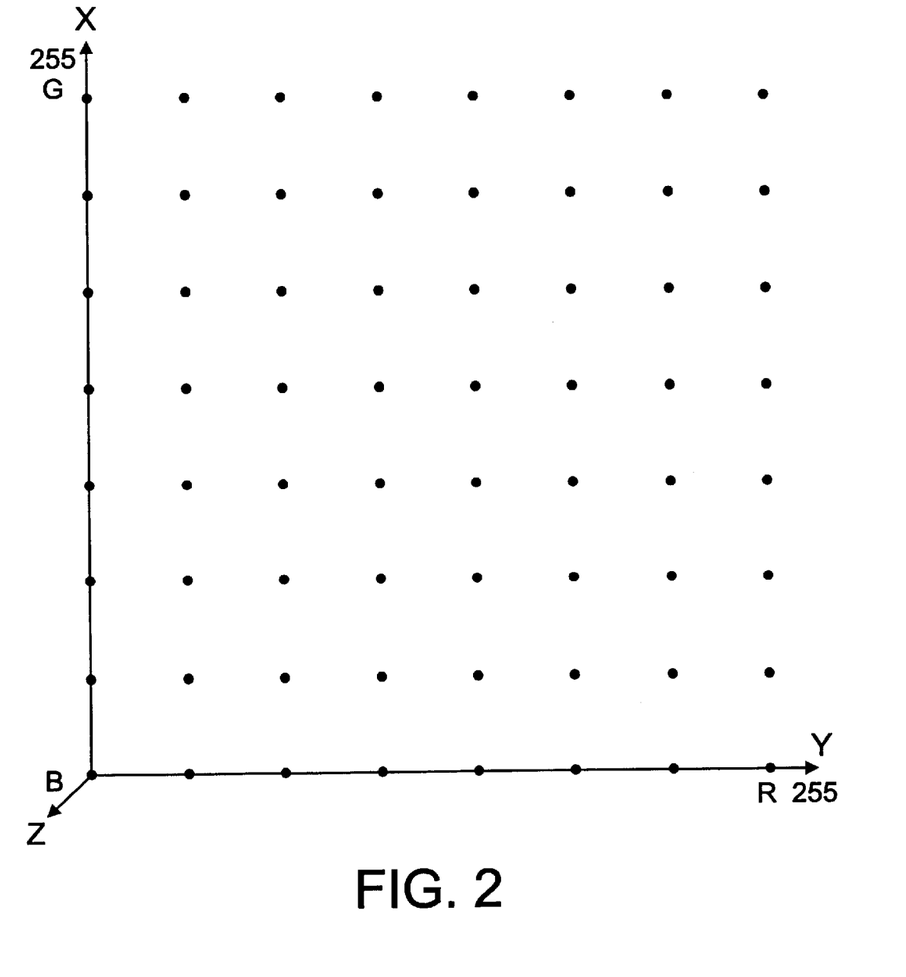
FIG. 2 is an example of the locations of outputs in color space according to the prior art system shown in FIG. 1.

A detailed conceptual view of the three-dimensional table 10 is shown in FIG. 2. What is shown in FIG. 2 is intended to be one cross-section of a three-dimensional space, in which the axes correspond to the red, green, and blue components of the input colorimetric signals. Starting at the origin, there exists a relatively small amount of a particular color space.

As shown in FIG. 2, there exists a large number of points (i.e. nodes) within the relevant area of color space, with each point approximating a particular color in the visible spectrum. Every possible input to look-up table 10 will correspond to one such node in the three-dimensional color space. Every single discrete node in the three-dimensional color space is associated with a unique combination of CMYK colorants which most closely approximate the RGB combination for that location. Interpolation techniques are used to locate and simulate colors which are not precisely placed on a particular node. In order to perform the conversion, in general, each of the original RGB signals is mapped to a unique node in the three-dimensional color space, and then the CMY or CMYK combination associated with that particular spot is read out and applied, for example, to a color xerographic printing apparatus.

As also shown in FIG. 2, the axes of the primary RGB colors range in intensity from 0-to-255, as is typical with current-day color image-processing apparatus. Further, this 0-to-255 range is divided into eight equal sections along each axis. Although the sections demarcated by the locations in the graph are equally-spaced, it is known in the art to provide systems where the locations corresponding to the output are not regularly spaced along one or another axis.

Although the diagram of FIG. 2 shows a section of color space divided into 8×8×8 distinct locations, it is common, in currently-available apparatus, to provide a three-dimensional look-up table having 16×16×16=4096, or even 32×32×32=32768, distinct entries for a CMYK output.

Figure 3:
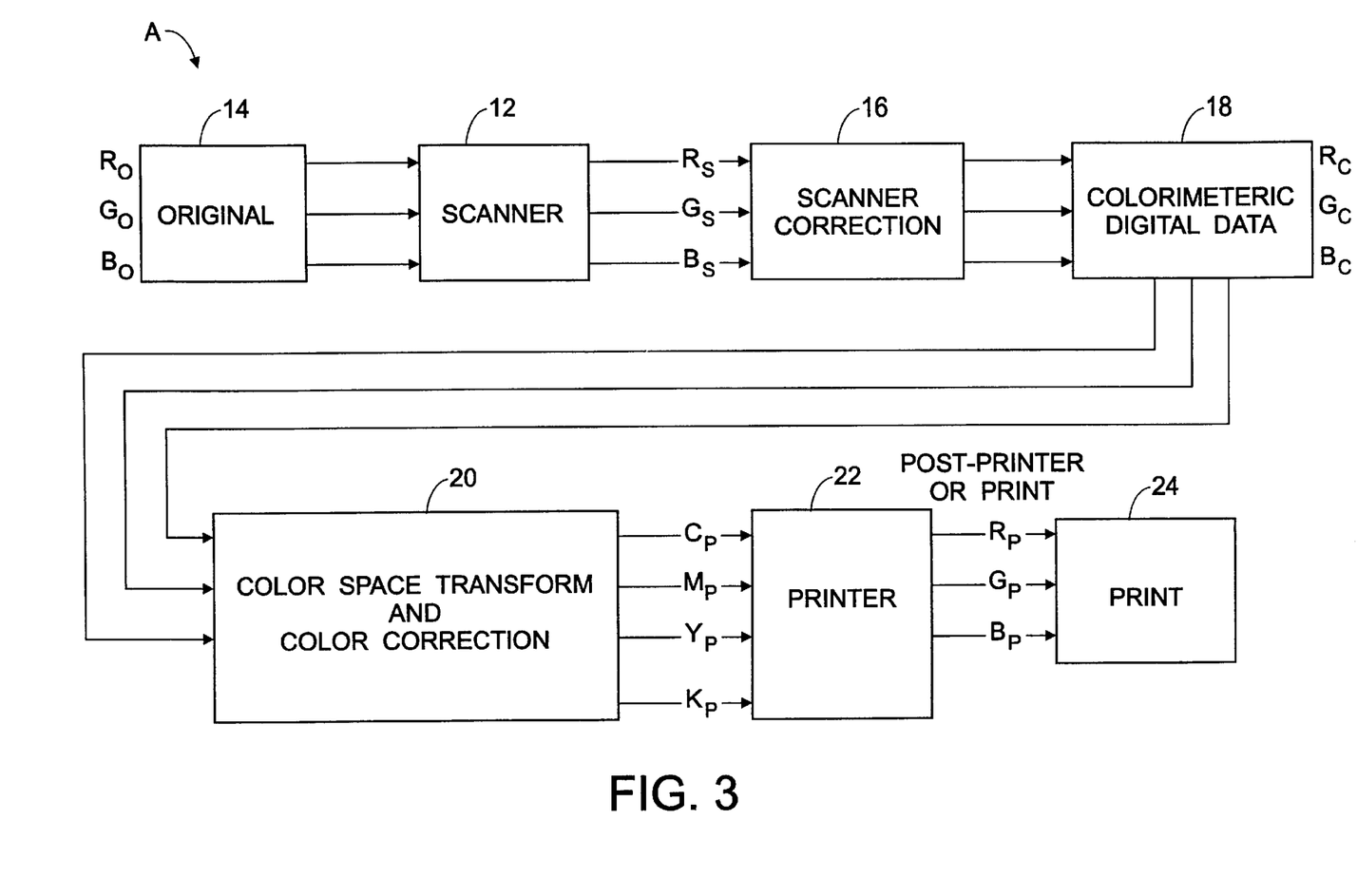
FIG. 3 is a block diagram of a scanning/printing system with color transformation, for converting device-independent image descriptions to device-dependent image descriptions.

FIG. 3 depicts a block diagram of a printing system A which includes a scanner 12 which can be calibrated to produce a set of digital colorimetric or device independent data describing a scanned image 14, which, by definition can be defined in terms of R, G, B space. Resulting from the scanning operation is a set of scanner image signals $R_s$, $G_s$, $B_s$, defined in device dependent scanner terms. Incorporated into the scanner or another processing path is a post-scanning processor 16, which provides correction of scanner image signals $R_s$, $G_s$, $B_s$, to CIE color space XYZ or its transform CIELAB color space in which equal distance represents approximate color differences. The corrected signal is then stored in an image file 18 as colorimetric terms $R_c$, $G_c$, $B_c$. The values may be in terms of CIE color space (r,g,b), or the L*a*b* luminance-chrominance space ($LC_1C_2$). A color space transform block 20, such as that described in U.S. Pat. No. 4,275,413 to Sakamoto, or other methods can be used to convert the device independent data to device dependent data.

The output of color space transform block 20 is the image defined in terms of a device dependent space, or colorant driving signal $C_p$, $M_p$, $Y_p$, $K_p$, that will be used to drive printer 22 to generate print 24. In one possible example, the colorant values represent the relative amounts of cyan, magenta, yellow, and black toners that are to be deposited over a given area on an electrophotographic printer. The printed output image may be said to be defined in terms of $R_p$, $G_p$, $B_p$, which are intended to have a relationship with $R_o$, $G_o$, $B_o$ such that the printer has a color that is colorimetrically similar to the original image, although that similarity is ultimately dependent upon the gamut of the printing device. When we refer to colorimetric spaces, we are referring to spaces which are transforms of CIE XYZ space. When we refer to device dependent space, we refer to a color space which is defined only in terms of the operation of the device using it. Also, while many color spaces have three dimensions, it is possible to have color spaces with less than three dimensions or more than three dimensions.

Figure 6:
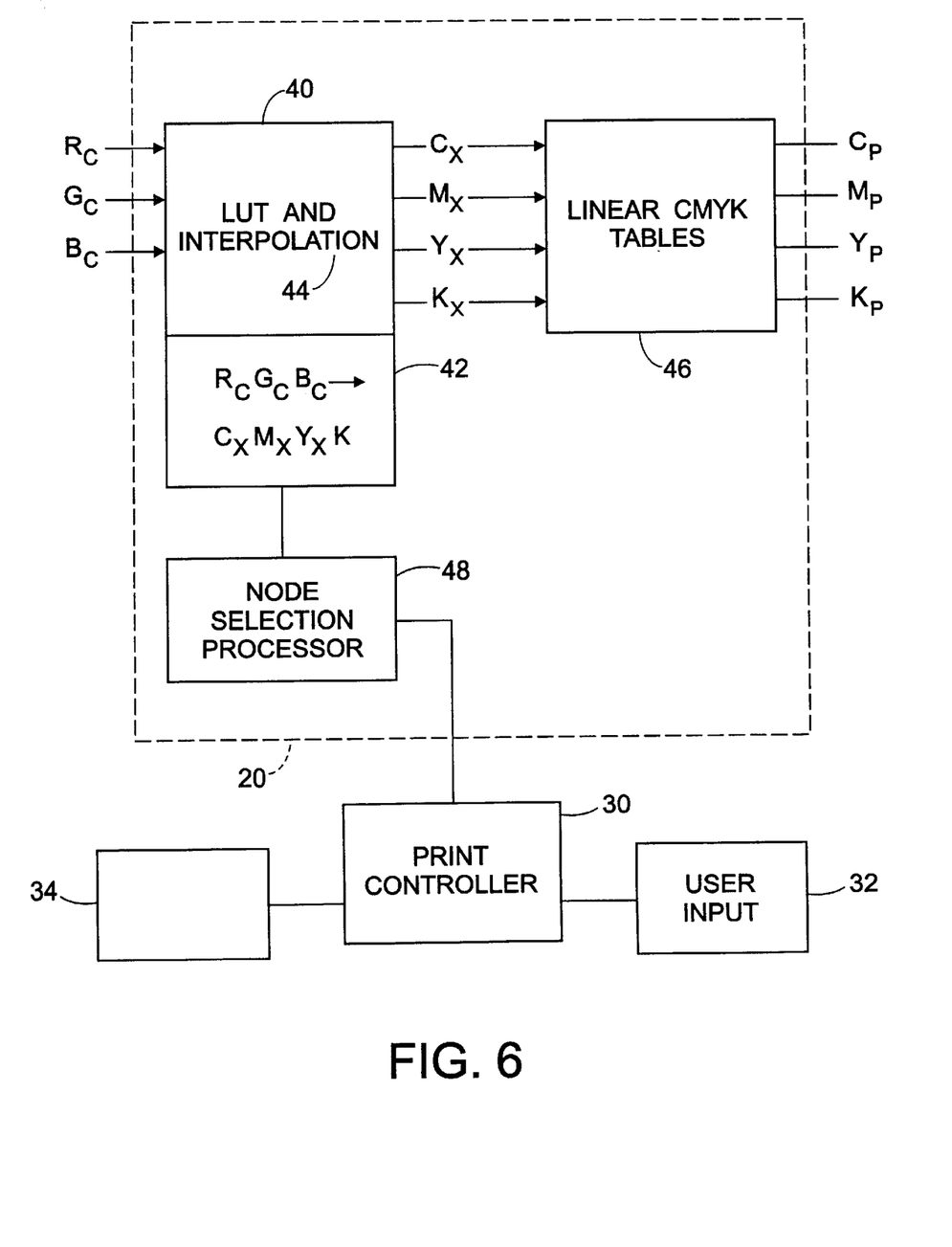
FIG. 6 is a detailed block diagram of a pre-printing processor and color controller shown in FIG. 5.

With reference to color space transform block 20 as shown in FIG. 6, initially, color signals $R_c$, $G_c$, $B_c$ are processed to generate address entries to a look-up table which stores a set of transform coefficients with which the $R_c$, $G_c$, $B_c$ may be processed to convert them to $C_x$, $M_x$, $Y_x$ colorant signals or any multi-dimensional output color space including but not limited to CMYK or spectral data. Values which are not mapped may be determined through interpolation processing.

It will no doubt be recognized that there are many methods of providing a transform from device independent data to device dependent data, such as those previously mentioned. Once a conversion table is established, a method of interpolation referred to as tri-linear or cubic interpolation may also be used to calculate output values from the limited set of input values. The values stored in the look-up table can be empirically derived, as in Sakamoto, or calculated or extrapolated based on empirical information, as in Po-Chieh Hung, "Tetrahedral Division Technique Applied to Colorimetric Calibration for Imaging Media", Annual Meeting IS&T, N.J., May, 1992, pp. 419–422; Po-Chieh Hung, "Colorimetric Calibration for Scanners and Media", SPIE, Vol. 1448, Camera and Input Scanner System, (1991); Sigfredo I. Nin, et al., "Printing CIELAB Images on a CMYK Printer Using Tri-Linear Interpolation", SPIE Proceedings, Vol. 1670, 1992, pp. 316–324; and James M. Kasson et al., "A tetrahedral Interpolation Technique for Color Space Conversion", presented at IS&T/SPIE Electronic Imaging, January, 1993. For a color space conversion method using more than three dimensions, refer to U.S. Pat. No. 4,511,989 to Sakamoto.

To create the table, a set of color patches are created, preferably including determined linearization and black addition. This is done by printing and measuring about some 1000 patches (although as previously noted as few as 500 and as many as 5000 patches have been used in some systems) of printer colors distributed throughout the color space, i.e., a large set of printer driving signals are generated, in varying densities of combinations of C, M, Y, K, and used to drive the printer. The color of each patch may be measured, using a spectrophotometer or by another manner to determine color in terms of $R_cB_cG_c$. The measured colors of these patches are used to build a three dimensional look-up table (LUT) relating $R_c$, $B_c$, $G_c$ defined colors to $C_xM_xY_x$ defined colors. Conversions that do not include mapped and measured nodes may be interpolated or extrapolated (e.g. U.S. Pat. No. 5,416,613 to Rolleston entitled, "Color Printer Calibration Test Pattern", and U.S. Pat. No. 5,471,324 to Rolleston entitled, "Color Printer Calibration With Improved Color Mapping Linearity", previously incorporated herein by reference for their teachings of look-up table generation).

Figure 4:
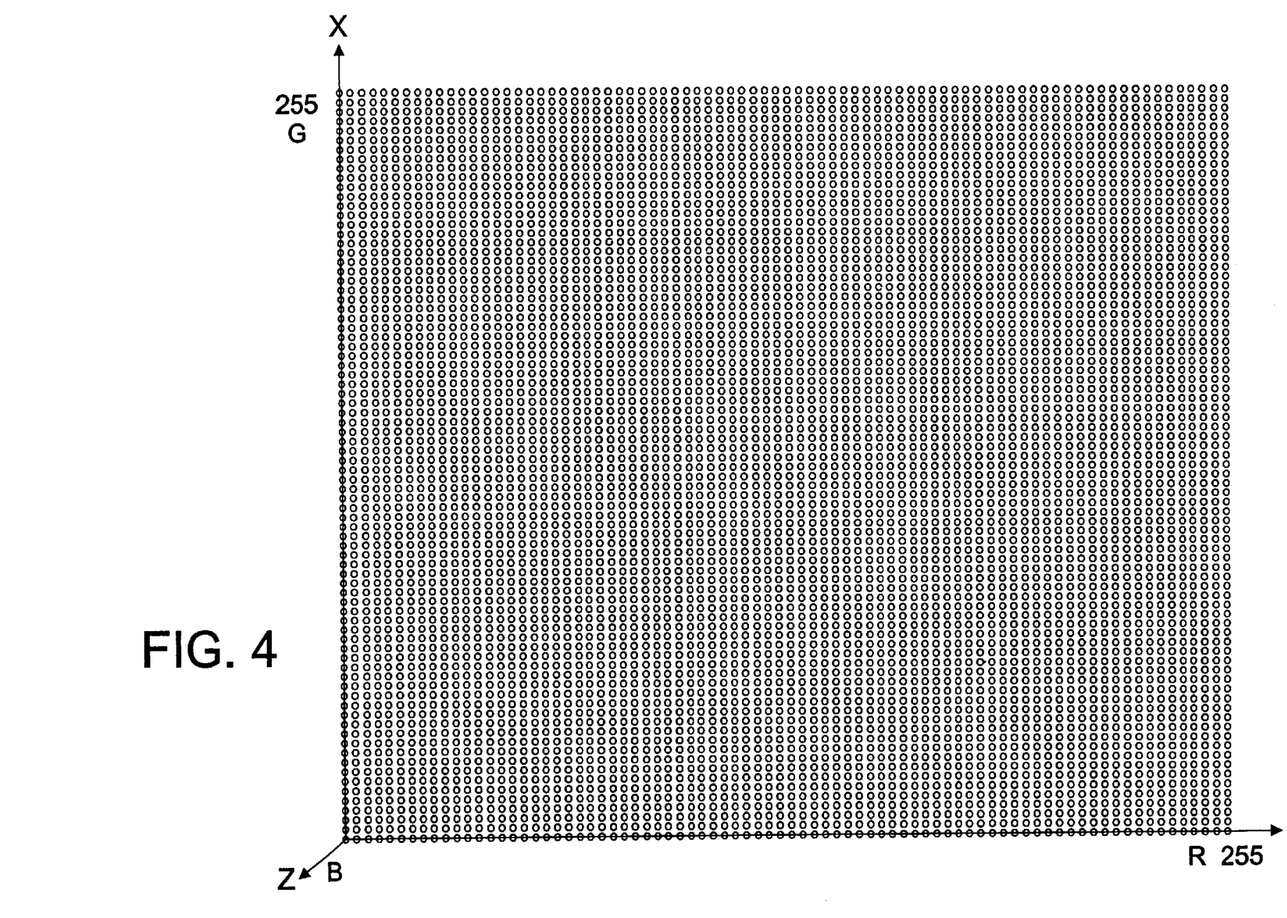
FIG. 4 is an example of the locations of outputs in a color space according to the teachings of the present invention.

Turning now more specifically to a first aspect of the present invention, as shown in FIG. 4, a detailed conceptual view of a three-dimensional table according to the teachings of the present invention is shown. FIG. 4 is intended to be one cross-section of a three-dimensional space, in which the axes correspond to the red, green, and blue components of the input colorimetric signals. When compared to FIG. 2 which is a one cross-section of a three-dimensional space according to a look-up table in the prior art, it can be seen that the corresponding table of FIG. 4 has a much higher density of nodes. In particular, if FIG. 2 is considered to have 1000 such nodes, FIG. 4 represents a situation where there are 10,000 nodes. Thus, the number of nodes generated for a look-up table according to the teachings of the present invention are a magnitude higher than commonly used in existing systems for the same space.

As previously noted in regard to existing systems, having such a large number of nodes would require undesirable processing time for conversion and interpolation which in turn would not allow the printing system to operate in substantially real time. However, these shortcomings exist in systems where the look-up table is essentially a static element. On the other hand, in the present invention, a method and apparatus is being described for a dynamic optimized color look-up table allowing transformation based on specific image requirements which can change from one image to the next.

Figure 5:
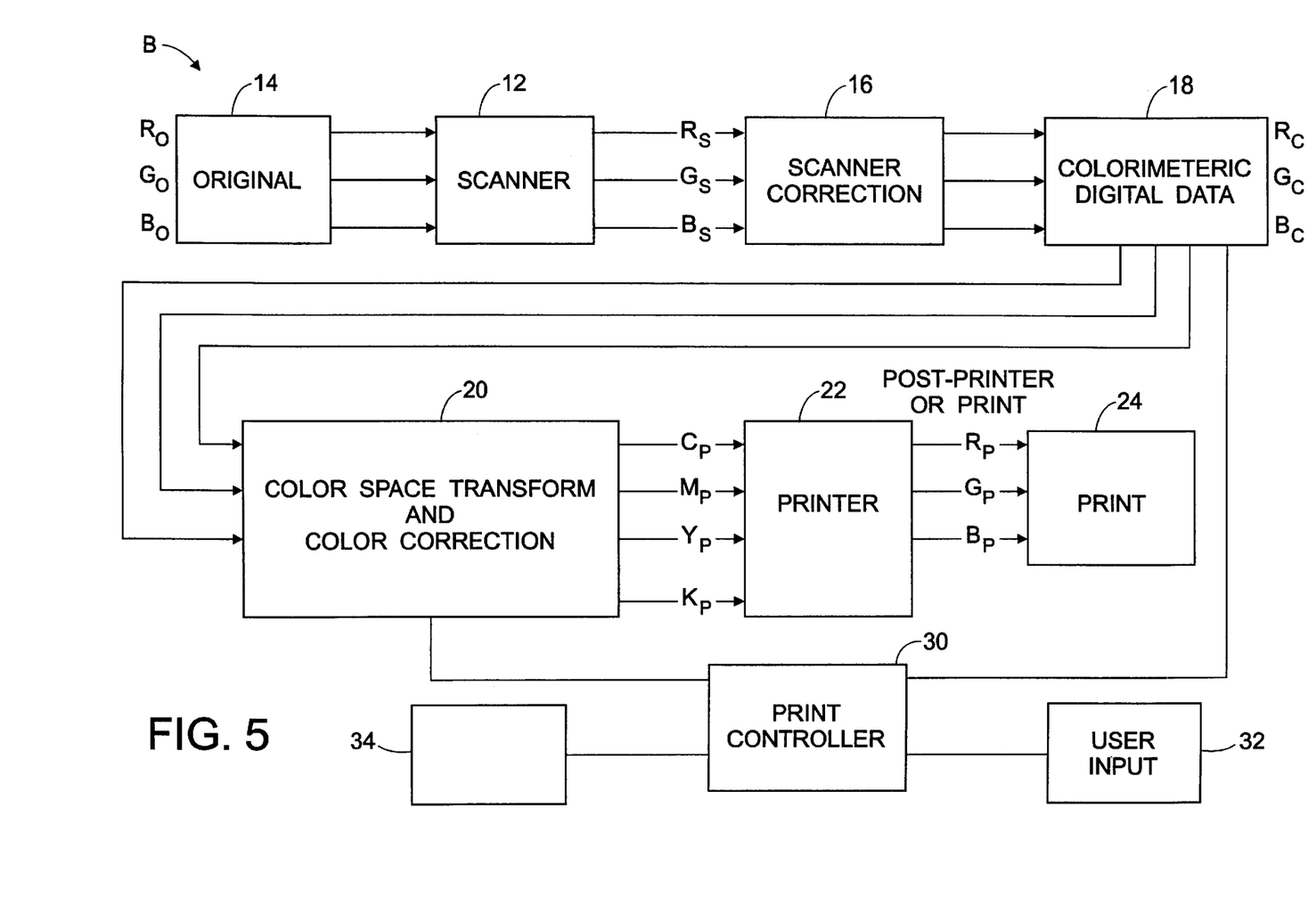
FIG. 5 is a block diagram of a scanning/printing system with color transformation for converting device-independent image descriptions to device-dependent image descriptions according to the teachings of the present invention.

Turning attention to FIG. 5, shown is a color printing system B according to the teachings of the present invention. In printing system B, prior to the color conversion process, an image file 18 containing the colorimetric digital data is interrogated by a printer controller 30 to determine data distribution within the color space for a specific image. It is to be appreciated that while image file 18 is shown as being interrogated by printer controller 30, this is simply provided as an example. An image file containing image data to be interrogated may be found in any image storage space prior to the color transformation. Therefore, the image file may be within the color space transform block 20 in files of scanner 12, or scanner correction block 16.

In one example of such processing, the interrogation may determine what colors are within an image, the density of the colors and the amount of a particular color. This information is then provided to a printer controller 30. The data received by this interrogation is then used in combination with instructions from a user input block 32 or color control block 34 to generate signals which in turn are used to selectively activate nodes of color space transform block 20. Only an amount of nodes which will allow for real-time processing are activated for the color conversion and interpolation processing. Based on the supplied information and processing, active nodes will be at locations of the color space which have been determined to be most relevant. In this manner, greater precision as to colors of selected importance or areas is increased.

Reference is now made to FIG. 6 which shows a more detailed view of color space transform block 20. The $R_c$, $G_c$, $B_c$ color signals are directed to a look-up table/interpolation processing block 40. Block 40 includes a three dimensional look-up table which may be stored in a device memory 42 such as a RAM or other addressable memory device, which will meet speed and memory requirements for a particular device. Color signals $R_c$, $G_c$, $B_c$ are processed to generate address entries to look-up table which stores a set of transform coefficients with which the $R_c$, $G_c$, $B_c$ signals may be processed to convert them to $C_x$, $M_x$, $Y_x$, $K_x$ colorant signals or any multi-dimensional output color space including but not limited to CMYK or spectral data. Values which are not directly mapped from the table are determined using interpolation techniques of interpolation system 44. Subsequent to the $R_c$, $G_c$, $B_c$ to $C_x$, $M_x$, $Y_x$, $K_x$ mapping, which includes black addition for under color removal, gray balance processing 46 is performed to generate colorant driving signals $C_p$, $M_p$, $Y_p$, $K_p$, as described for example in U.S. Pat. No. 5,305,119 to Rolleston which has been incorporated herein by reference. Colorant driving signals $C_p$, $M_p$, $Y_p$, $K_p$ are then output to a printer for reproduction of the original scanner signals $R_s$, $G_s$, $B_s$ on the printer.

With further attention to FIGS. 5 and 6, prior to processing color signals $R_c$, $G_c$, $B_c$ by look-up table/interpolation processing block 40, printer controller 30 generates a signal received by node selection processor 48. Data from node selection processor 48 provides inhibit signals to addresses of look-up table 42 which are not selected for activation. In an alternative embodiment, the addresses stored in the look-up table 42 may each be in a normally inhibited state and the signal from node selection processor 48 will act to only activate those addresses which are selected in accordance with the signal from printer controller 30.

It will be noted that while node selection processor 48 is shown within color transform block 20, this processor can in fact be incorporated within printer controller 30, or function in a substantially stand-alone system. The operational importance of node selection processor 48 is to use information regarding the color space of the image to be transformed and parameters entered via the system in order to make a selection as to which nodes will be active. Various ones of the parameters which may be entered may be dependent upon the particular type of transformation process being used. For example, if the process requires an equal spacing of nodes for proper transformation, this will be one of the parameters submitted. On the other hand, if it is desirable to select a set of non-equidistant nodes from a larger set of nodes, this requirement will be processed as a parameter. Additionally, the selection processor 48 may do a node by node calculation or a coarser calculation of areas within which nodes should be activated or deactivated.

Following activation, image color space transformation processing, including matching of values to specific nodes in a look-up table, and interpolation for nodes not matched is undertaken.

Thus, prior to the color conversion process, the present system interrogates image file 18 (FIG. 5) holding colorimetric image data to determine the distribution of the color within the color space. Thereafter, a subset of nodes existing in look-up table 42 are selected which best fit the distribution of color within the image in accordance with parameters input into the system.

The node selection process may involve complex modeling algorithms to accomplish the reapportionment of node arrangements or a simple algorithm could also be used. Such an algorithm is shown for example in FIG. 7, where it is assumed the image page is in CIELAB or converted to CIELAB. In step 50, an analysis of the distribution of color within the CIELAB color space for a rasterized image processed page (RIP) is undertaken. In step 52 an analysis is made of the a*, b* quadrants for probability density distribution. Then in step 54 quadrants are apportioned nodes in accordance with the color density distribution determined.

Figure 7:
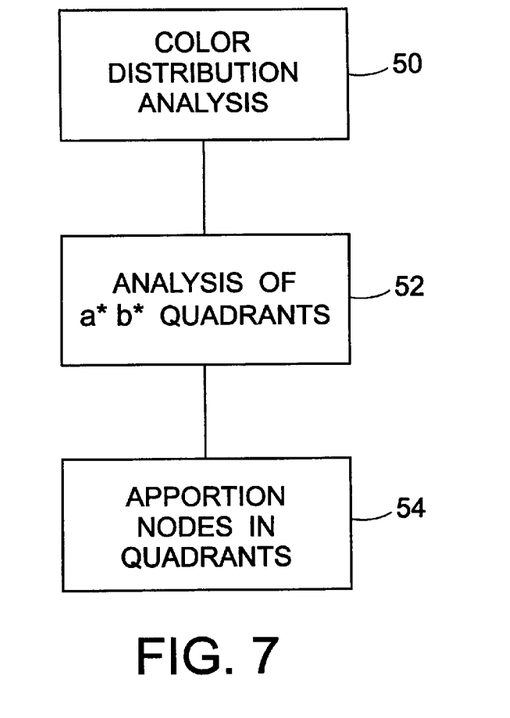
FIG. 7 is a flow chart of an algorithm which may be used for determining parameters for node selection according to the present invention.

Such an example as shown in FIG. 7 could be automated and input through the color control block 34. Under this scenario, each time an image is processed such input and reapportionment would automatically take place.

As an alternative, node distribution could also be optimized to include a high density of nodes within color regions that have been determined by specific customer requirements. This information could be input into the printing system via spectrophotomer measurements of a proof print, the attachment to a job, page or image, a color definition of the color(s) that are considered critical. This information could also be included in the page description language (PDL) file, image file or job ticket, where such information may be provided via user input 32. The active nodes of the look-up table are then reapportioned with a higher density of nodes applied to the region(s) which the customer has determined to be critical.

Figure 8:
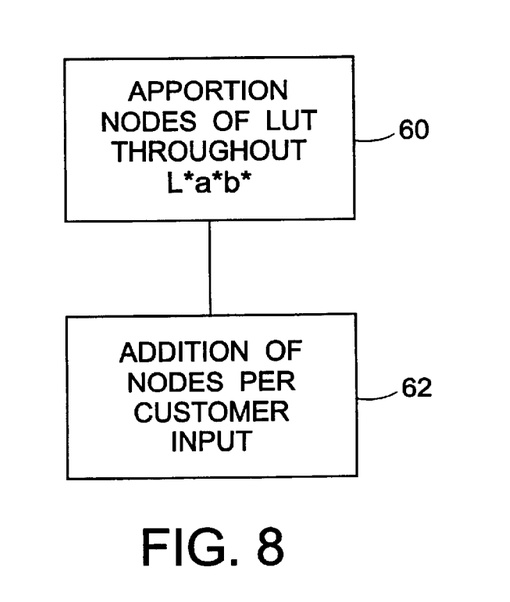
FIG. 8 is an alternative algorithm for node selection according to the present invention.

For such customer-critical colors, complex modeling algorithms can be instituted for reapportionment or simple algorithms may be used. For example as shown in FIG. 8, and under the assumption that the customer job and the critical color(s) are in CIELAB or converted to CIELAB the following processing can take place. As shown in step 60, the look-up table nodes would be apportioned for L*a*b* to printer CMYK, 6 L*a*b* units apart throughout L*a*b*, then in step 62, the process adds additional nodes 2 L*a*b* units apart within 10 L*a*b* units of the customer-defined critical colors.

It is also noted that algorithms such as those described above could be combined when using customer-defined critical colors along with an understanding of the color distribution of the RIPed page.

A specific manner in which the density values of color distribution could be uncovered is through the use of a histogram. It is noted that a histogram generator generates a histogram signal from the image signals. Histograms map the statistical distribution of pixels at each intensity level possible within an image, i.e. the dynamic range of first scan signals. In a multi-bit space, such as 8-bit space, the intensity levels will be distributed between 0 and 255.

Figure 9A:
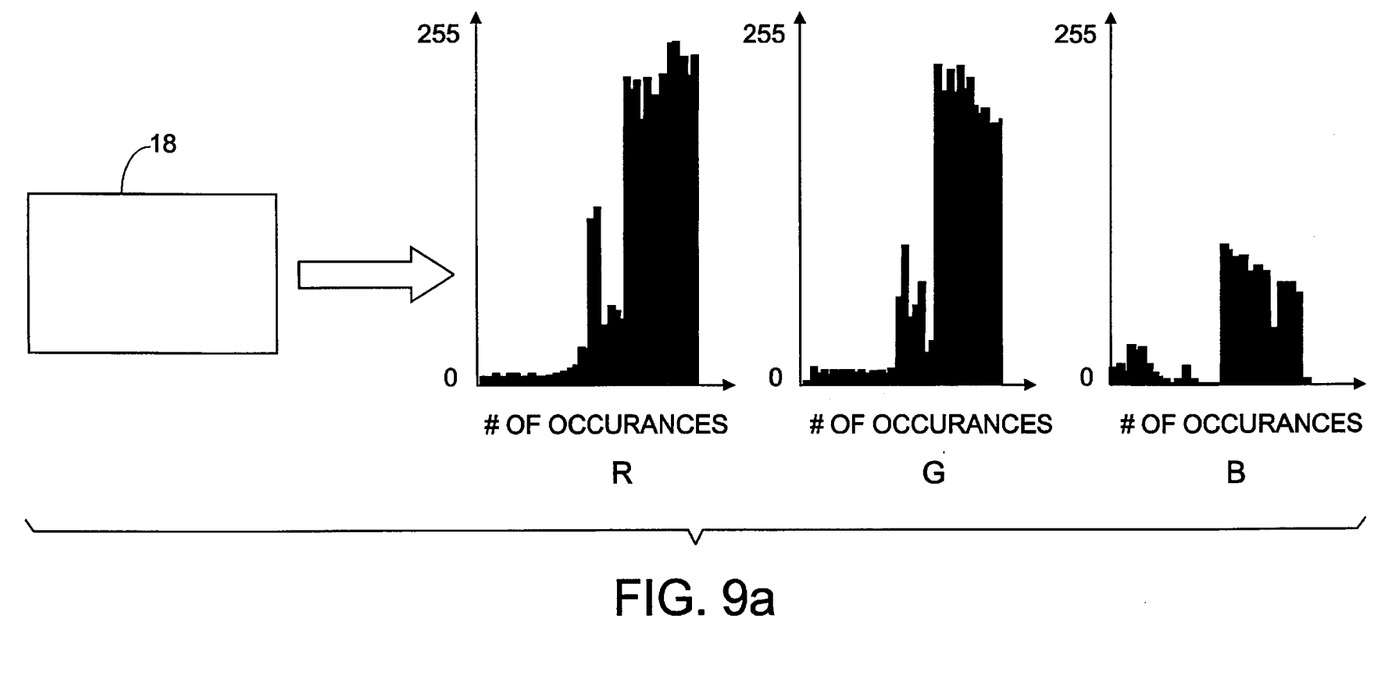
FIG. 9a illustrates the use of an image analysis operation to determine distribution of color in an image to be printed.
Figure 9B:
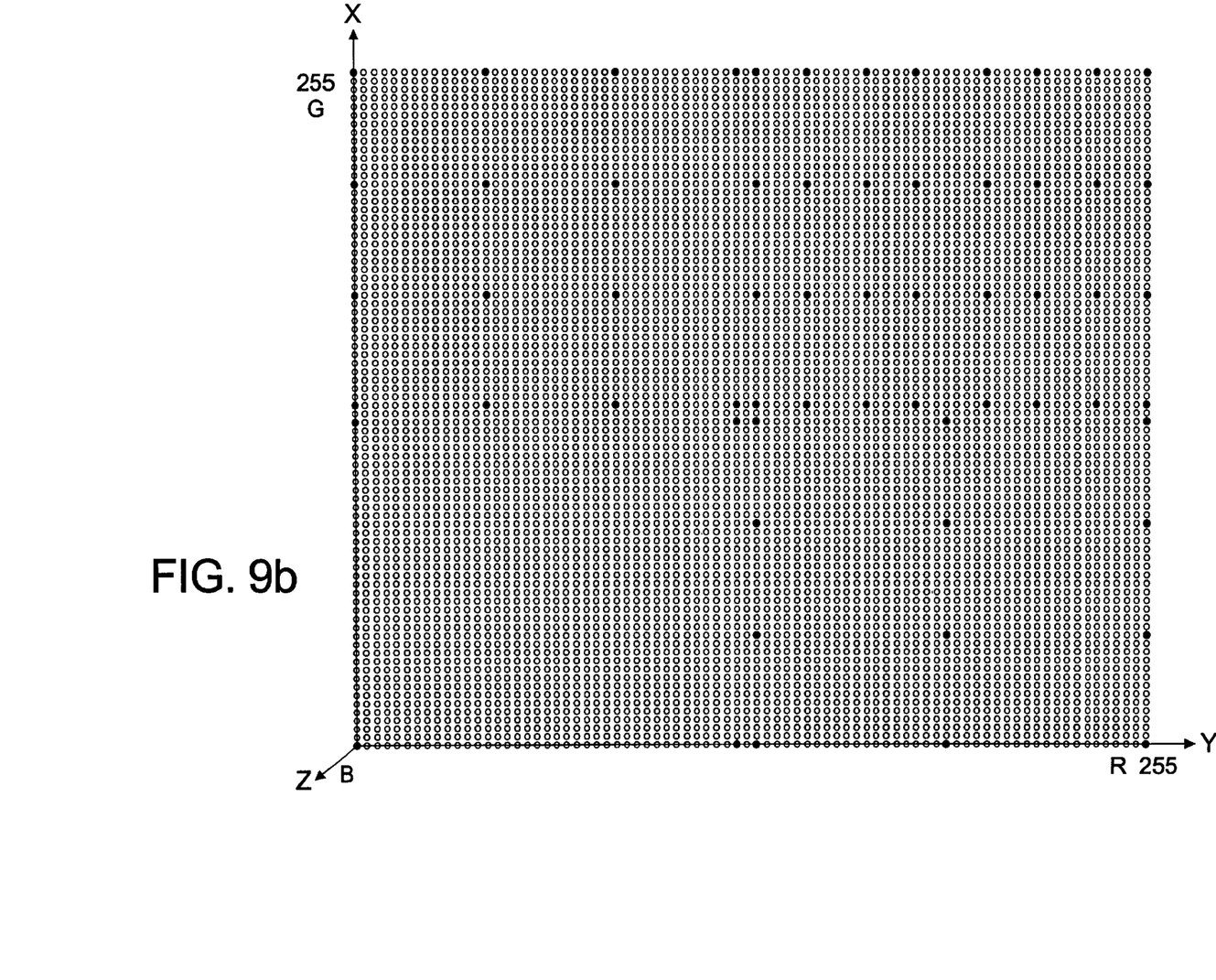
FIG. 9b illustrates a one cross-section of a three-dimensional space wherein various nodes of the space are shown as active while others are in a non-active state.

FIGS. 9a and 9b show a simple example of how nodes of a look-up are used to re-apportion the areas of greatest interest. Image analysis processing is used to determine that an image to be processed (i.e. by reading the image file) has various amounts of red, green and blue coloring, with red having the largest number of pixels of a high intensity, green the second most, and blue the least. The image analysis may be accomplished by use of histogram-type analysis.

Applying the information from the histogram (i.e. the interrogation of the image file) the printer controller 30 will forward information instructing node selection processor 48 (of FIG. 6) to activate a higher number of nodes located in the upper right corner (e.g. 32 nodes) of the transform area with a next highest amount of nodes being activated the upper left (e.g. 16 nodes) and lower right (e.g. 12 nodes) of the transform area, and the least in the lower left area (e.g. 4 nodes). This operation will cause the image which is to be output to have higher precision in the upper end of the red and green value ranges. The results of this operation are depicted in FIG. 9b, where nodes in the upper right range, corresponding to higher intensity reds and greens, are predominant, while nodes in the upper left and lower right range are for the next level of intensity, and nodes in the lower left range have the least active nodes. In FIG. 9b nodes that are active are shown as "●", and nodes which are not active are "○". This transformation allows for higher image detail for images in low, medium, or high key. The present invention also allows for the best use of the look-up table's limited allocation to the corresponding image's color distribution within the print engine's color gamut.

It is known that the human eye is more sensitive to low chroma color errors. Therefore, this knowledge may be used as another parameter of the system.

It is to be appreciated that any number of criteria could be used to determine where the higher density of active nodes would be located in the look-up table. One specific manner would be a region where it is more desirable to get specific detail in an area such as shadows, slight color changes, etc. The capability to provide selective density within images on an image-to-image basis processing is possible due to the dynamic nature of the look-up table as described in the foregoing. This is a distinguishing feature from existing systems which provide bias densities in a static fashion such that image-to-image reapportionment of the nodes in a look-up table are not possible. Another criteria which can be used to determine location of active nodes is based on an interrogation of an output device, such as printer 22. In particular the output device can be interrogated to determine its gamut and/or gamut mapping strategy. Using the obtained information, the present invention can then selectively limit the number of nodes activated on outer boarder of the output device's gamut, if so desired.

The invention has been described with reference to the preferred embodiment. Obviously modifications and alterations will occur to others upon a reading and understanding of this specification. It is intended to include all such modifications and alterations insofar as they come within the scope of the appended claims or the equivalents thereof.

Having thus described the invention, it is now claimed:

1. A method for improving precision of a color look-up table used to transform an image from an input color space to a device dependent print engine color space, the method comprising:

building a look-up table having nodes that will be used in transformation of image signals from the input color space to the device dependent print engine color space;

interrogating an image file containing information of the image to be printed to determine the distribution of color within the image color space;

determining desired parameters to be followed in the transformation of the image;

selecting a subset of the nodes to be active during the image transformation processing based on the interrogating of the image file and the desired parameters; and processing the image from the input color space to the device dependent print engine color space using the selected nodes.

2. The method according to claim 1 wherein the step of building the look-up table includes defining a number of nodes greater than will be used in any single image transformation processing.

3. The method according to claim 1 wherein the step of determining desired parameters includes selecting a specific color as a color having a high level of importance.

4. The method according to claim 1 wherein the step of determining desired parameters includes using customer specified parameters.

5. The method according to claim 1 wherein the parameters are entered into the printing system by at least one of, using a spectrophotometer measurement of a proof print, attaching the parameters to a job, page or image, a color definition of the colors considered critical, and including the information in a page description language file, image file or job ticket.

6. The method according to claim 1 wherein the step of selecting the subset of nodes includes making such selection for each image to be transformed.

7. The method according to claim 1 wherein the step of building the look-up table includes generating a three-dimensional look-up table which has at least 10,000 nodes.

8. The method according to claim 1 wherein the step of processing includes generating a direct transformation for image signals existing on the nodes and performing interpolation processing for image signals not located on the nodes.

9. The method according to claim 1 wherein the steps of interrogating an image file, selecting the subset of nodes, and processing the image take place such that the overall image printing processing takes place in substantially real-time.

10. The method according to claim 1 wherein the step of selecting the subset of active nodes includes one of activating selected nodes in the look-up table which are to be used in the processing and deactivating nodes in the look-up table which are not to be used in the processing.

11. An image processing apparatus which converts an input color image signal of a color space into an output color image signal of another color space, and outputs the converted color image signal, said image processing apparatus comprising:

an image file containing information regarding an image to be processed;

an interrogation device in operative connection to the image file, wherein the interrogation device determines the distribution of the image signals within the image file;

a look-up table storing a plurality of nodes, the look-up table being used for conversion from the first color space to the second color space;

a node selection device for selecting a subset of the nodes stored within the look-up table, wherein only those nodes selected are active for the image processing operation.

12. The apparatus according to claim 11 further including a parameter input device for inputting parameters defining a manner in which the image is to be transformed.

13. The apparatus according to claim 12 wherein the parameter input device is configured to use information from the interrogation device in order to generate signals for the node selection device.

14. The apparatus according to claim 11 wherein the look-up table is generated with a number of nodes greater than will be used in any single image transformation processing.

15. The apparatus according to claim 11 wherein the look-up table is a three dimensional look-up table which has at least 10,000 nodes.

16. The apparatus according to claim 11 further including an interpolation processor.

17. An image processing method for converting an input color image signal containing a plural number of color components, which define a first color space into an output color image signal containing a plural number of other color components, which define a second color space, the image processing method comprising the steps of:

interrogating an image file containing information of the image to be printed to determine the distribution of color within the image color space;

determining desired parameters to be followed in the transformation of the image;

selecting a subset of the nodes of a look-up table which are to be active during the image transformation processing, based on the interrogating of the image file and the desired parameters; and processing the image from the first color space to the second color space using the selected nodes.

18. The method according to claim 17 further including:

interrogating an output device to obtain information regarding at least one of a gamut and gamut mapping strategy of the output device; and using the obtained information to limit the number of nodes activated on an outer border of the output device's gamut.

19. The method according to claim 17 wherein the step of selecting from among the plurality of nodes, includes selecting from among a number of nodes wherein at least some of the nodes will not be selected.

20. The method according to claim 17 wherein the step of selecting a subset of nodes includes making such a selection for each image to be transformed.

21. A method for transforming an image description in a first color space to an image description in a second color space, the method comprising:

creating a finely partitioned universal look-up table, the table including, because of the fine partitioning, a number of nodes larger than that to be used in the transformation process, the nodes containing transformation information for precisely translating a first color space color description into a second color space color description;

analyzing the first color space image description;

selecting a first subset of nodes and a second subset of nodes from the nodes of the universal lookup table, the selection being based on the analysis, the first and second subsets selected for use in transforming the image, the total number of nodes in the first subset and the second subset selected to be a practical number of nodes for use in the transformation process, the first subset of nodes being finely distributed over a first region of color space, the first region encompassing colors that are defined as being important colors in the image, and the second subset of nodes being coarsely distributed over a second region of color space, the second region of color space encompassing colors that are defined as being less important in the image, the coarser distribution compensating for an expense associated with selecting the relatively finely distributed nodes; and using the selected first and second subsets of nodes, to the exclusion of the unselected nodes, to transform the image description from the first color space to the image description in the second color space.

22. The method of claim 21 wherein the step of analyzing comprises:

using image analysis process to determine a number of occurrences within the image of particular colors.

23. The method of claim 22 wherein the step of selecting comprises:

selecting nodes for the first subset that are related to colors with a relatively high number of occurrences; and selecting nodes for the second subset that are related to colors with a relatively low number of occurrences.

24. The method of claim 21 wherein the step of analyzing comprises:

viewing the image; and determining regions of important colors and regions of less important colors based on a viewers experience and/or preferences.

25. The method of claim 24 wherein the step of selecting comprises:

selecting nodes for the first subset that are related to the important color regions; and selecting nodes for the second subset that are related to the less important color regions.

26. An image processing system comprising:

a reference look-up table including nodes distributed throughout color space at a high resolution;

a node selector operative to select a subset of nodes from the reference look-up table for use in the transformation of a particular image based on characteristics of the particular image;

an image transformer operative to use information from nodes of the selected subset to transform pixels from a first color space description of the image to a second color space description of the image; and a printer operative to accept the second color space description of the image and render the image.

27. The image processing system of claim 26 wherein the printer is a xerographic printer.

* * * * *